United States Patent
Tormen (10) Patent No.: US 9,448,420 B2
(45) Date of Patent: Sep. 20, 2016

(54) EYEGLASSES TEMPLE

(71) Applicant: LUXOTTICA S.R.L., Agordo (IT)

(72) Inventor: Alessandro Tormen, Belluno (IT)

(73) Assignee: LUXOTTICA S.R.L., Agordo (IT)

( * ) Notice: Subject to any disclaimer, the term of this patent is extended or adjusted under 35 U.S.C. 154(b) by 0 days.

(21) Appl. No.: 14/413,509

(22) PCT Filed: Jun. 27, 2013

(86) PCT No.: PCT/IB2013/055274
§ 371 (c)(1),
(2) Date: Jan. 8, 2015

(87) PCT Pub. No.: WO2014/009831
PCT Pub. Date: Jan. 16, 2014

(65) Prior Publication Data
US 2015/0160473 A1  Jun. 11, 2015

(30) Foreign Application Priority Data

Jul. 10, 2012 (IT) ................ B02012A0372

(51) Int. Cl.
*G02C 5/14* (2006.01)
*G02C 5/00* (2006.01)
*G02C 5/16* (2006.01)

(52) U.S. Cl.
CPC . *G02C 5/14* (2013.01); *G02C 5/00* (2013.01); *G02C 5/146* (2013.01); *G02C 5/16* (2013.01); *G02C 2200/04* (2013.01); *G02C 2200/08* (2013.01)

(58) Field of Classification Search
CPC .... G02C 2200/06; G02C 5/22; G02C 5/143; G02C 5/146; G02C 5/20
USPC ................ 351/119, 156, 116, 111
See application file for complete search history.

(56) References Cited

U.S. PATENT DOCUMENTS 5,594,511 A * 1/1997 Lin ................ G02C 3/003
351/111
5,652,637 A  7/1997 Marini
(Continued)

FOREIGN PATENT DOCUMENTS

CN  201107478 Y  8/2008
DE  9113330 U1  2/1993
(Continued)

OTHER PUBLICATIONS

International Search Report for corresponding application PCT/IB2013/055274 filed Jun. 27, 2013; Mail date Nov. 6, 2013.

*Primary Examiner* — Hung Dang
(74) *Attorney, Agent, or Firm* — Cantor Colburn LLP (57) ABSTRACT

An eyeglasses temple comprises a first portion, having an end hingeable to a front rim of the eyeglasses and a fastening end, and a second portion, having an end designed to rest on a wearer's ear and a fastening end, the fastening ends being connectable by a snap-in connection; a first of the fastening ends comprises an elongate member extending in a longitudinal direction and having a tongue from which a tooth projects transversely to the longitudinal direction, the tongue being elastically deformable to allow the tooth to move in a locking direction transversal to the longitudinal direction; the second of the fastening ends comprises a socket having an opening to guide the insertion and extraction of the member into and from the socket in the longitudinal direction, and internally defines, on a wall which delimits the socket, a recess shaped to receive the tooth.

15 Claims, 6 Drawing Sheets

(56) References Cited

U.S. PATENT DOCUMENTS

| | | | |
|---|---|---|---|
| 6,145,985 A | 11/2000 | De Marchi et al. | |
| 6,834,952 B2 * | 12/2004 | Polovin | G02C 5/10 351/111 |
| 7,059,717 B2 * | 6/2006 | Bloch | G02C 3/003 351/119 |
| 2004/0160570 A1 | 8/2004 | Polovin | |
| 2006/0244897 A1 | 11/2006 | Guenther | |

FOREIGN PATENT DOCUMENTS

| | | |
|---|---|---|
| DE | 202010014993 U1 | 4/2011 |
| EP | 0950914 A1 | 10/1999 |
| FR | 2907921 A1 | 5/2008 |

* cited by examiner

EYEGLASSES TEMPLE

TECHNICAL FIELD

This invention relates to an eyeglasses temple.

BACKGROUND ART

In the eyeglasses trade, it is known that eyeglasses have a frame comprising a front rim mounting the lenses and two temples hinged to the front rim so they can rotate from a folded position to an open position where the eyeglasses can be worn.

One end of each temple is hinged to the front rim and the other end is designed to be rested on an ear of the person wearing the eyeglasses.

Known in the prior art, for example from patent documents US2004160570A1 and US2006244897A1, are temples divided into a first and a second portion which can be fastened and unfastened from each other by means of a snap-in connection system.

Other technical solutions about temples having detachable parts are disclosed in the following patent documents: FR2907921A1, EP0950914A1, U.S. Pat. No. 5,652,637A, DE202010014993U1, DE9113330U 1.

This allows the wearer of the eyeglasses to easily substitute a part of the temple and thus change the appearance of the eyeglasses.

These solutions are not, however, free of disadvantages.

A first disadvantage of the prior art solutions is that the connection system by which the two portions of the temple can be fastened and unfastened adversely affects the aesthetic appearance of the eyeglasses, since it is clearly visible when looking at the eyeglasses.

Another disadvantage of the prior art solutions is due to the fact that the connection system is not very robust or efficient, which means it breaks frequently and does not allow a secure connection between the two portions of the temple which, instead, tend to become loose.

A further disadvantage of the prior art solutions is that the fastening systems are easily dirtied. This situation is made worse by the fact that in the prior art systems, the portions of the temples must be unfastened with the fingers which, as is well known, are covered by a lipid layer which is transferred to the system every time it is touched.

DISCLOSURE OF THE INVENTION

This invention has for an aim to provide an eyeglasses temple which overcomes the above mentioned disadvantages of the prior art.

More specifically, the invention has for an aim to provide an eyeglasses temple which is divided into two detachably fastenable portions and which is aesthetically very pleasing.

A further aim of the invention is to provide an eyeglasses temple divided into two portions which are detachably fastenable through the agency of a particularly stable and secure system.

These aims are fully achieved by the eyeglasses temple according to this invention as characterized in the appended claims.

More specifically, according to the invention, a first fastening end comprises an elongate member extending in a longitudinal direction and having a tongue from which a tooth projects transversely to the longitudinal direction, the tongue being elastically deformable to allow the tooth to move in a locking direction transversal to the longitudinal direction.

Further, a second fastening end comprises a socket having an opening to guide the insertion and extraction of the member into and from the socket in the longitudinal direction, and internally defines, on a wall which delimits the socket, a recess which is shaped to receive the tooth by means of a snap-in connection.

Thus, the fastening system is hidden because, when the two portions of the temple are fastened, the elongate member is fully inserted in the socket and is not visible from the outside.

This makes the temple according to the invention aesthetically very refined.

It is observed that said cavity, which delimits the socket, defines said recess internally; therefore, the wall is shaped (i.e. contoured) to define said recess, but nevertheless (the wall) has the function of delimiting the cavity; in fact, said wall is without through holes or openings and said recess is a blind recess.

The above mentioned feature reduces the probability that dirt penetrates in the socket and improves the temple aesthetically.

In this light, when the two portions of the temple are fastened, the fact that the tooth occupies a recess inside the socket and abuts against a protrusion which projects inside the socket makes the solution advantageous not only in terms of aesthetic appearance but also in terms of keeping the temple clean because it is difficult for dirt to find its way into the socket.

In light of this, it should be noted that, besides the aforementioned socket, the second fastening end also defines a passage configured to place the recess in communication with the outside of the second fastening end.

Preferably, this passage is a slot (or a thin hole) configured to allow insertion of a small release key.

This makes it difficult for dirt to penetrate inside the cavity and allows the two portions of the temple to be unfastened without touching the fastening ends with the fingers.

It should be noted that, preferably, the fastening end comprising the socket, that is, the female fastening end, is an end of the first portion of the temple, whilst the fastening end comprising the elongate member, that is, the male fastening end, is an end of the second portion of the temple whose other end rests on the wearer's ear.

It is, however, possible to change the positions of the fastening ends round so the female end is on the second portion of the temple and the male end is on the first portion of the temple.

Further, it should be noted that generally speaking the invention provides a fastening system by which two ends of an eyeglasses frame can be detachably joined to each other.

In the preferred embodiment, the two ends to be fastened are the ends of the portions of a temple which is divided into two portions by a transverse break across the longitudinal axis. In this case, the first portion can be fastened to the front rim defining the hinge and the second portion can be rested on the wearer's ear.

This fastening system, however, might be used in other ways in the context of the eyeglasses.

In effect, the temple might define a fastening end transversely (relative to a longitudinal direction of extension of the temple), for example by means of a socket (defining the female part) directed transversely to the longitudinal direction (of extension of the temple); or by means of an elongate member, again transversely to the longitudinal direction (of extension of the temple), for example separated from the rest of the temple by transverse cuts made in the temple (in such a way that it does not protrude from the temple). In these cases, one portion is the temple proper, whilst the other is a decorative element (for example bearing a logo or text) which can be detachably fastened to the rest of the temple by means of the fastening system.

The two fastening ends (one with the male part and the other with the female part, as described in this patent application) might also be the free ends of the two temples (or respective extensions of the two temples), so that the temples can be fastened to each other.

In light of this, the invention provides a fastening system for detachably connecting two parts of an eyeglasses frame defining respective fastening ends which can be joined to each other by a snap-in connection (and a frame comprising the fastening system), wherein:

a first of the fastening ends comprises an elongate member extending in a longitudinal direction and having a tongue from which a tooth projects transversely to the longitudinal direction, the tongue being elastically deformable to allow the tooth to move in a locking direction transversal to the longitudinal direction;

the second of the fastening ends comprises a socket having an opening to guide the insertion and extraction of the member into and from the socket in the longitudinal direction, and internally defines, on a wall which delimits the socket, a recess which is shaped to receive the tooth by means of a snap-in connection.

Preferably, said parts of the frame are the temples.

More preferably, said parts of the frame are a first and a second portion of the same temple.

Still more preferably, as described in detail with reference to the example embodiment, said parts of the frame are a first and a second portion of the same temple having a transverse break across said longitudinal axis, so that a first portion can be hinged to the front rim and a second portion can be rested on the wearer's ear.

Preferably, the female fastening end is made of metal, whilst the male fastening end is made of plastic.

More specifically, the female fastening end (that is, the entire first portion of the temple, which preferably comprises the female fastening end) is preferably made using Metal Injection Moulding (MIM) technology. This allows the part to be made in a single production process, obtaining a part with complex geometry in a single run and at a relatively low cost.

The apparatus used to mould the female fastening end (that is, the entire first portion of the temple, which preferably comprises the female fastening end) preferably comprises a mould equipped with at least one (more preferably, two) parallel, non-coplanar sliders.

The male fastening end, on the other hand, is preferably made of a plastic material as a single piece with the respective portion of the temple (preferably, the second portion of the temple).

As regards the male fastening end, it should also be noted that the shape of the elongate member (and, consequently, also the shape of the socket defining the female end) is designed to provide a particularly effective fastening without clearances and hidden from view, by means of a male and female interference fit.

More specifically, the elongate member and the socket are shaped in such a way that insertion of the elongate member into the socket creates pressure (on account of the interference fit) along two axes which are perpendicular to each other and perpendicular to the longitudinal direction of insertion and extraction of the elongate member into and from the socket.

A first pressure (that is, a first interference constraint) extends along a direction parallel to the locking direction along which the tooth is movable.

Preferably, the first pressure is due to the fact that the elongate member has a shoulder located in a zone of the member in front of the tongue, whilst the socket has a flaring in the proximity of the opening of the socket itself. Thus, the shoulder of the elongate member is inserted with interference into the flaring, which constitutes a guide for inserting the elongate member into the socket.

Preferably, the shoulder is located on the same face of the elongate member as the tooth, so that tooth and shoulder protrude in the same direction. The shoulder preferably has the shape of a wedge.

A second pressure (that is, a second interference constraint) extends along a direction perpendicular to the locking direction and transversal (that is, perpendicular) to the longitudinal direction (along which the member extends and along which the member is inserted into and extracted from the socket).

Preferably, the second pressure is due to the fact that the elongate member comprises (at least one but preferably) two resilient tabs projecting in the longitudinal direction and located at the sides of the tongue.

The tabs are elastically deformable in such a way that the free ends of the tabs are movable towards (and away from) the tongue interposed between them, moving substantially along a direction perpendicular to the longitudinal direction and to the locking direction.

The socket has an inner end zone shaped in such a way as to produce interference when the elongate member is inserted, so as to force the tabs to bend towards the tongue. More specifically, the socket has an inner end zone whose width, along a direction perpendicular to the longitudinal direction of extension of the socket and to the direction along which the recess extends, is smaller than the width of the elongate member, defined substantially as the distance across the opposite outer edges of the tabs.

It should be noted that the form with the two tabs on each side of the tongue is one of the possible solutions. Alternatively, the tongue might be divided into two portions (two-forked tongue) with resiliency in the direction coplanar with the tongue.

These pressures, produced by the interference fit in the male-female coupling between the elongate member and the socket, eliminate clearances and make the fastening between the two portions of the temple particularly stable and robust.

The fact that the socket is shaped in such a way that the elongate member can be hidden away inside it, that is, in such way the elongate member is contained completely within it and is not visible from the outside, offers two types of advantages.

Firstly, with regard to aesthetic appearance, the hidden fastening system provides a smooth and elegantly finished surface defined by the outside surface of the wall which internally defines the recess, to be used, if necessary for a logo or other design, even spanning across the two pieces.

Also, with regard to the functional aspect, this sealed fastening system (with the male part hidden away) is more reliable and durable because it reduces the risk of dirt finding its way into the socket.

It should be noted that the invention also provides a pair of eyeglasses, or rather, an eyeglasses frame also comprising, besides the temples as mentioned above, a release key designed to unfasten the first portion of the temple from the second portion and without which such unfastening would be particularly difficult.

Preferably, the release key has a code, for example a shaped profile, so as to prevent unfastening using an ordinary thin key.

BRIEF DESCRIPTION OF DRAWINGS

This and other features of the invention will become more apparent from the following detailed description of a preferred, non-limiting example embodiment of it, with reference to the accompanying drawings, in which.

DETAILED DESCRIPTION OF PREFERRED EMBODIMENTS OF THE INVENTION

Figure 1:
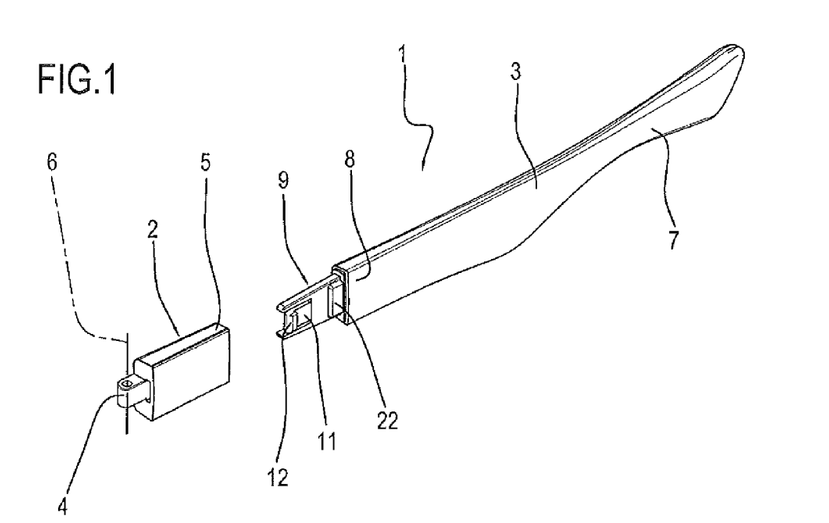
FIG. 1 is a perspective view of an eyeglasses temple according to the invention.
Figure 2:
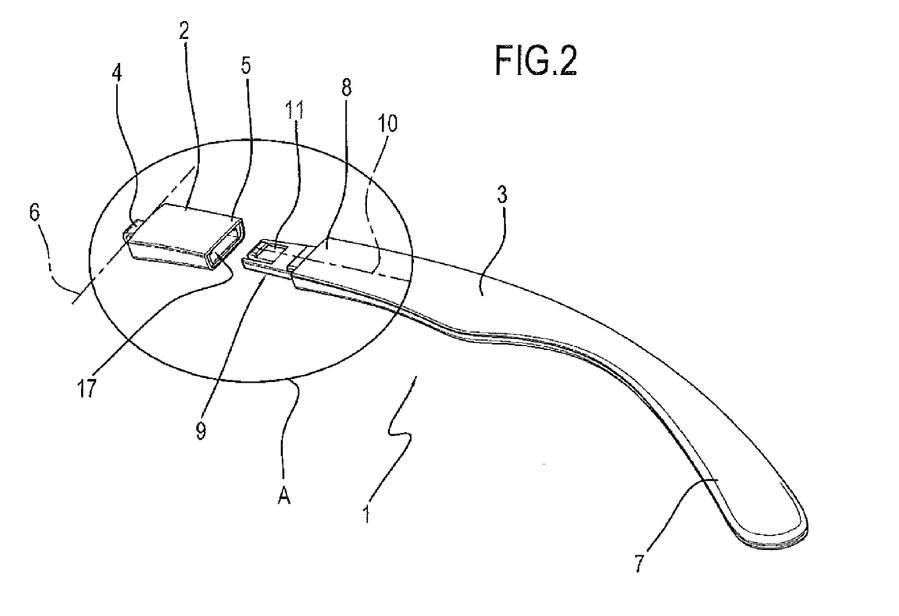
FIG. 2 illustrates the temple of FIG. 1 in a perspective view from a different angle.
Figure 3:
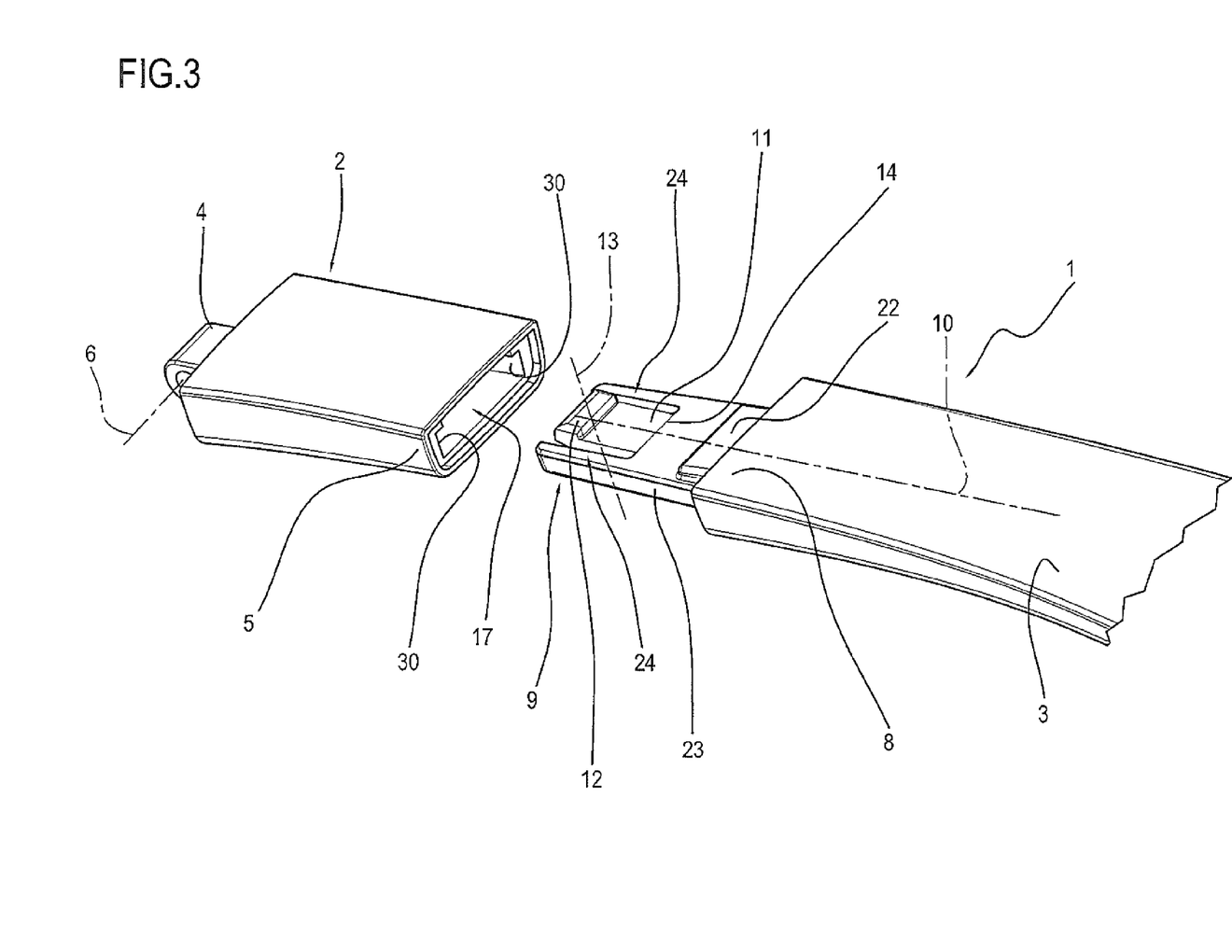
FIG. 3 illustrates an enlargement of the detail labelled "A" in FIG. 2.
Figure 4:
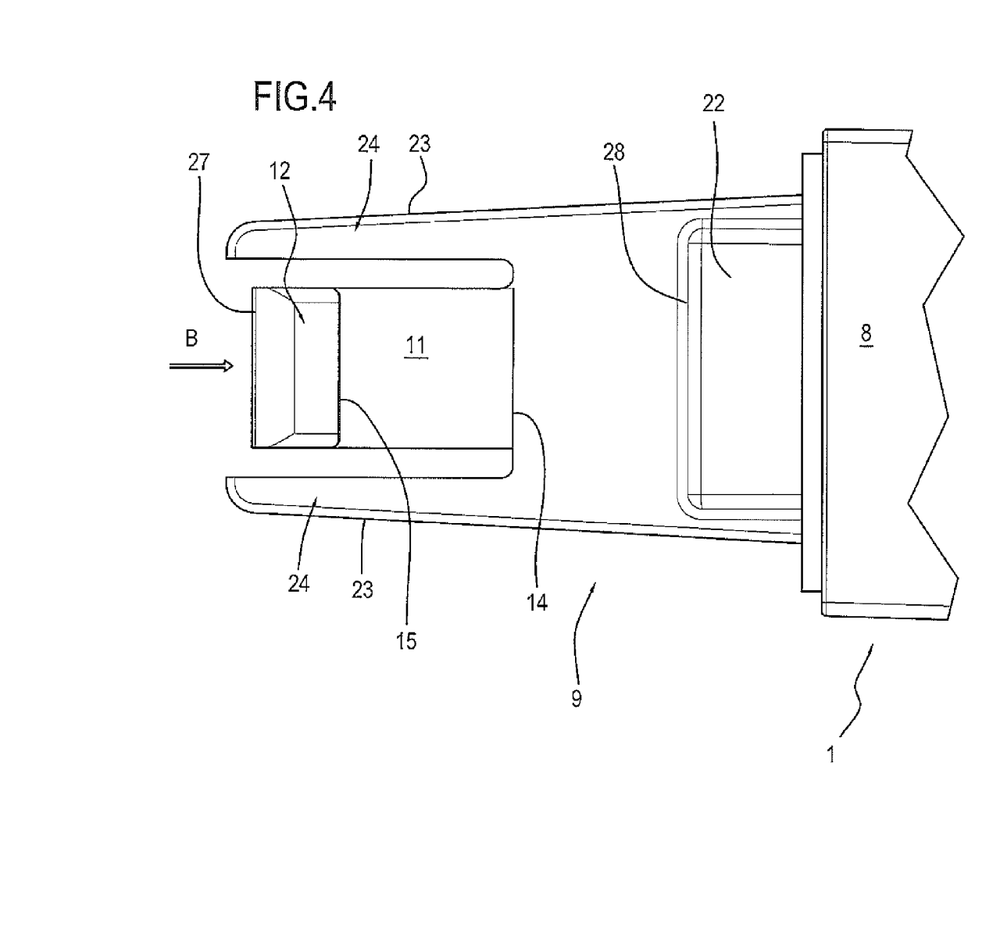
FIG. 4 is a top view illustrating a detail of the temple of FIG. 1.
Figure 5:
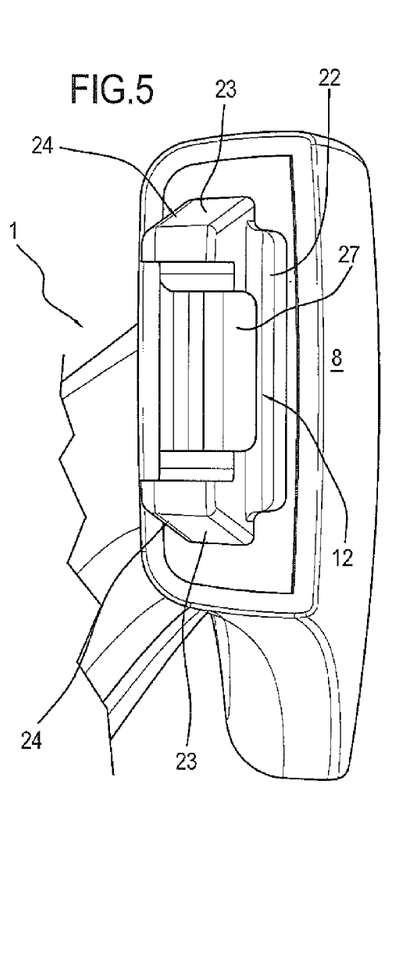
FIG. 5 shows the detail of FIG. 4 in a front view from the side labelled "B" in FIG. 4.
Figure 6:
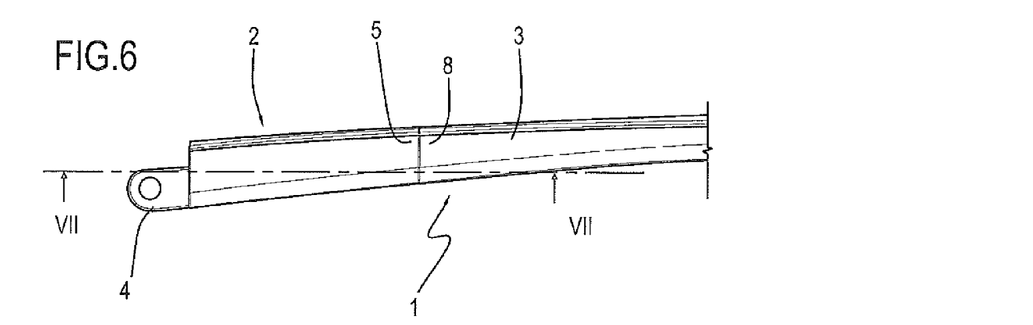
FIG. 6 shows the detail of FIG. 3 in a side view, with the first and second portions of the temple fastened to each other.
Figure 7:
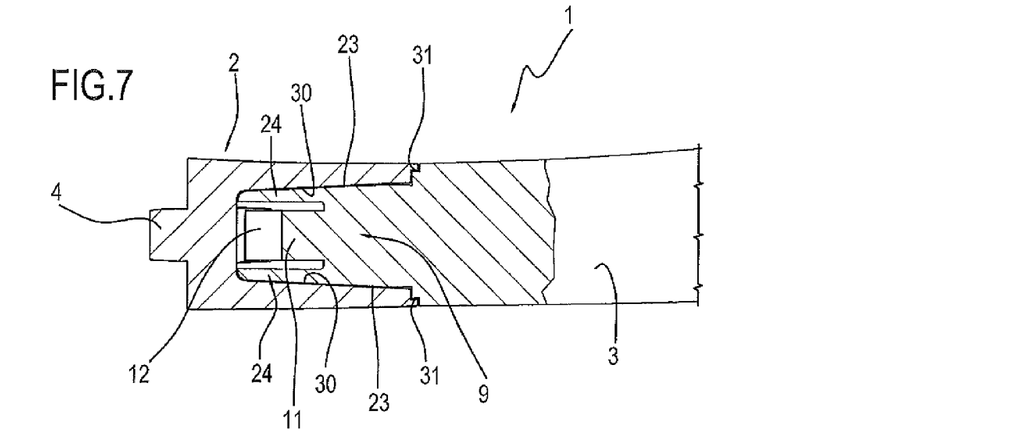
FIG. 7 is a cross-section of the detail of FIG. 6 through the plane labelled "VII" in FIG. 6.
Figure 8:
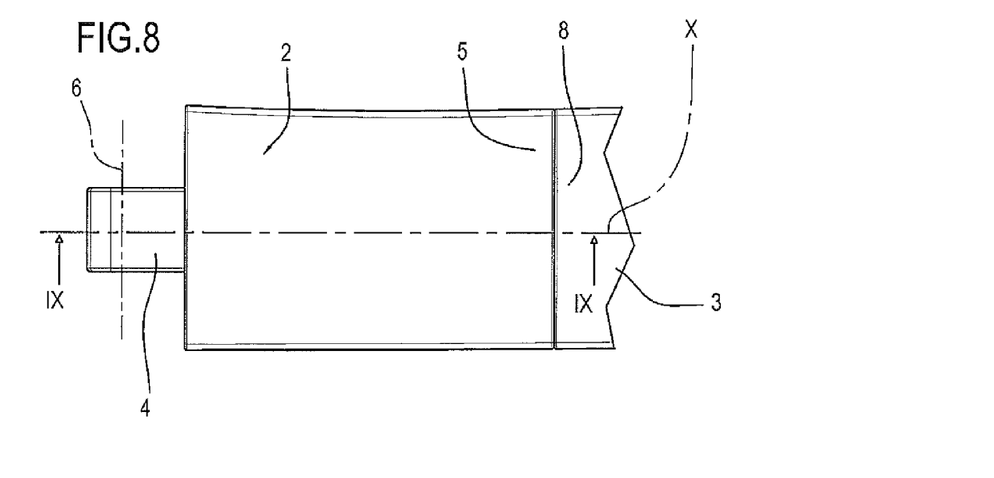
FIG. 8 shows the detail of FIG. 3 in a top view, with the first and second portions of the temple fastened to each other.
Figure 9:
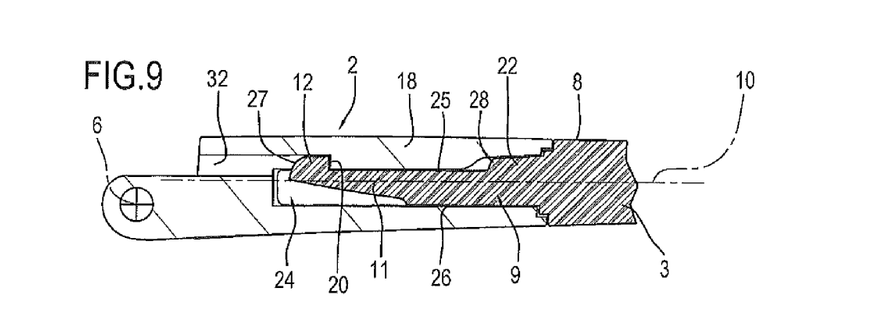
FIG. 9 is a cross-section of the detail of FIG. 8 through the plane labelled "IX" in FIG. 8.
Figure 10:
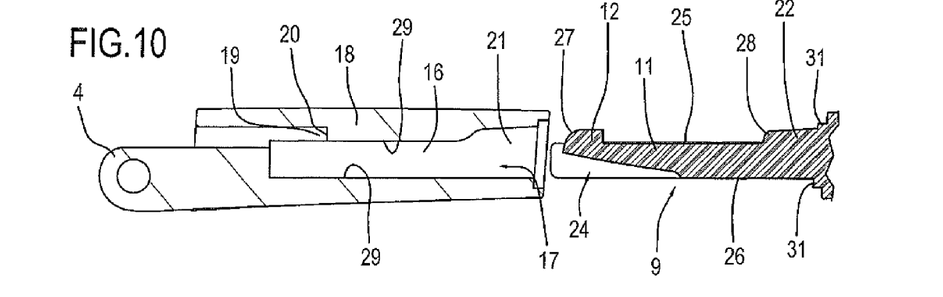
FIG. 10 shows the detail of FIG. 9 with the first and second portions of the temple unfastened.
Figure 11:
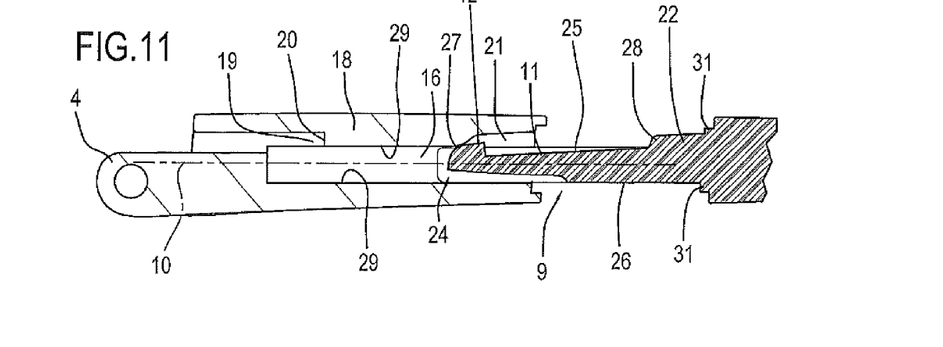
FIG. 11 shows the detail of FIG. 9 with the first and second portions of the temple partly fastened.
Figure 12:
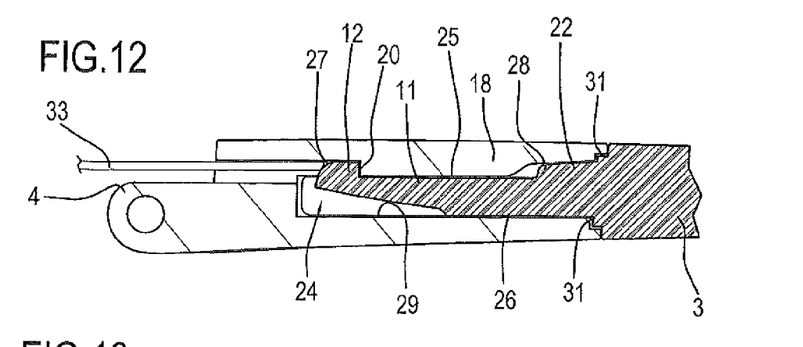
FIG. 12 shows the detail of FIG. 9, with a release element in a first operating position.
Figure 13:
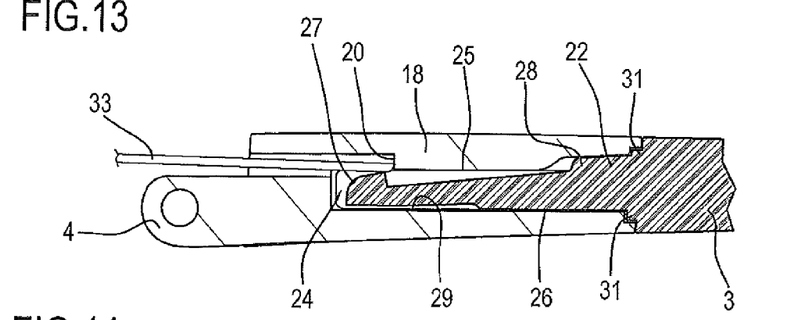
FIG. 13 shows the detail of FIG. 12, with the release element in a second operating position.
Figure 14:
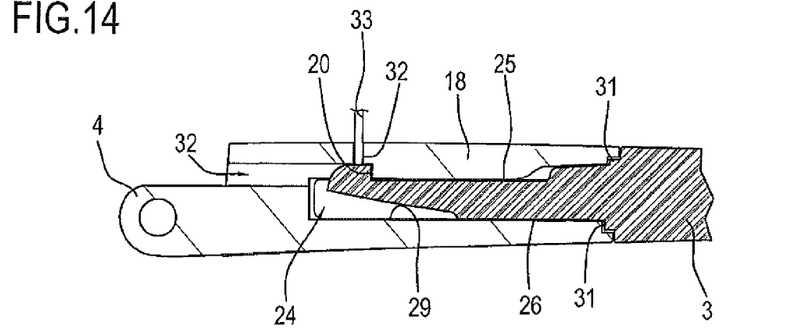
FIG. 14 shows the detail of FIG. 9, with a release element in a first operating position.
Figure 15:
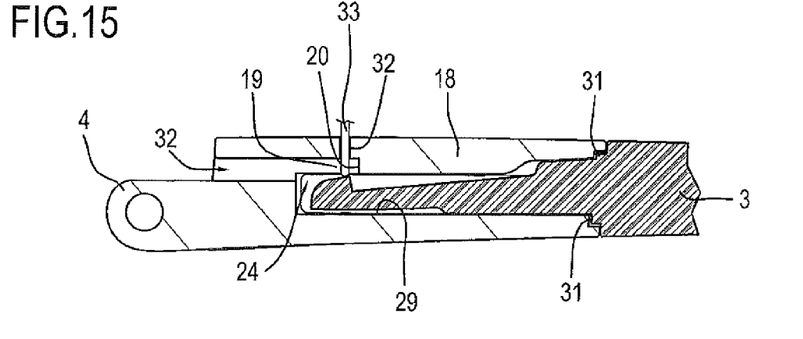
FIG. 15 shows the detail of FIG. 14, with the release element in a second operating position.

The numeral 1 in the drawings denotes a temple of an eyeglasses frame according to the invention.

The temple 1 comprises a first portion 2 and a second portion 3 which are detachably connected to each other.

The first portion 2 has an end 4 which can be hinged to the front rim of the eyeglasses, and a fastening end 5.

The end 4 which can be hinged to the front rim of the eyeglasses defines an axis of rotation 6 for a hinge between the temple and the front rim.

Thus, the end 4 of the first portion 2 of the temple is shaped in such a way as to enable the temple 1 to rotate about the hinge axis 6 when the temple is coupled to the front rim.

The second portion 3 of the temple 1 has an end 7 which is designed to be rested on a wearer's ear, and a fastening end 8.

The fastening ends 5 and 8 of the first and second portions 2 and 3 of the temple 1 are detachably connectable, being preferably connectable by a snap-in connection.

One (the first) of the fastening ends (in the example illustrated, the fastening end 8 of the second portion 3 of the temple 1) comprises an elongate member 9 extending in a longitudinal direction 10. The longitudinal direction 10 is substantially the direction along which the temple 1 of the eyeglasses extends.

The elongate member 9 has a tongue 11 projecting lengthwise towards the outside of the respective portion of the temple.

The elongate member 9 also comprises a tooth 12 which protrudes from the tongue 11 in a direction transversal (that is, perpendicular) to the longitudinal direction 10. The direction in which the tooth 12 protrudes from the tongue 11 will hereinafter be referred to as locking direction 13.

The tongue 11 has a root 14 connected to the rest of the elongate member 9 and a tip 15. The tongue 11 is connected to the rest of the member 9 only by the root 14.

The tongue 11 is elastically deformable to allow the tooth 12 to move in the locking direction 13.

Preferably, the tooth 12 is located at the tip 15 of the tongue 11.

The other (the second) of the fastening ends (in the example illustrated, the fastening end 5 of the first portion 2 of the temple 1) comprises a socket 16 having an opening 17 allowing the elongate member 9 to be inserted into and extracted from the socket 16 through the selfsame opening 17.

The opening 17 is shaped in such a way as to guide the elongate member 9 during insertion and extraction in the longitudinal direction 10.

According to the invention, the socket 16 internally defines, on a wall 18 which delimits the socket 16, a recess 19 which is shaped to receive the tooth 12 by means of a snap-in connection.

It is observed that said wall 18 is parallel to said longitudinal direction and delimits the socket 16. The recess 19 is blind (i.e. it is not through); hence, preferably, the wall 18 is without (through) holes or apertures for receiving the tooth 12.

The recess 19 forms a transversal wall 20 facing away from the opening 17. The wall 20 constitutes an abutment for the tooth 12 inserted in the recess 19, preventing it from moving lengthwise in the direction of extraction of the member 9 from the socket 16.

Thus, the elastic tongue 11 projects from the member 9 away from the respective portion of the temple 1 (that is, from the second portion 3 in the example illustrated).

The tooth 12 is located at the free end (on the tip 15) of the tongue 11, distal from the respective portion of the temple (that is, from the second portion 3 of the temple 1).

Preferably, the second fastening end (in the example illustrated, the fastening end 5 of the first portion 2 of the temple 1) defines a further recess 21 near the opening 17 of the socket 16. The further recess 21 defines a guide for inserting the elongate member 9 into the socket 16.

In other words, the further recess 21 constitutes a flaring, or wide portion, of the socket 16.

Preferably, the wall 18 delimiting the socket 16 and defining the recess 19 also defines the further recess (that is, the guide) 21.

The elongate member 9 also has a shoulder 22 located near a zone where it is connected to the respective portion of the temple 1 (in the example illustrated, the second portion 3 of the temple 1), shaped to be inserted with interference into the further recess 21.

The further recess 21 is preferably in the form of a trapezoidal slot.

The shoulder 22 is located on the member 9 at the back of the tongue 11.

Thus, the shoulder 22 is interposed between the root 14 of the tongue 11 and the end of the portion of the temple 1 which the member 9 is connected to.

It should be noted that the member 9 and the socket 16 preferably have a flattened shape. More specifically, the member 9 and the socket 16 are preferably flattened in a plane comprising the longitudinal direction 10 and perpendicular to the locking direction 13.

Thus, the socket (having a flattened shape) has two main directions of extension. One of these directions is the longitudinal direction 10, the other is a transversal direction, preferably a direction perpendicular to the locking direction 13, preferably parallel to the axis of rotation 6 of the hinge.

It should be noted that the elongate member 9 preferably has the shape of a wedge.

More specifically, the member 9 has two opposite side walls 23 defining a profile which is tapered towards the free end of the member 9, that is, towards the tooth 12.

Preferably, the side walls 23 of the member 9 are parallel to the locking direction 13.

Preferably, the elongate member 9 comprises two resilient tabs 24 projecting in the longitudinal direction 10 (of insertion and extraction of the member 9 into and from the socket 16) and located on opposite sides of the tongue 11.

In light of this, it should be noted that outer lateral surfaces of the tabs 24 constitute the side walls 23 of the elongate member 9.

The tabs 24 are elastically deformable in a direction transversal (that is, perpendicular) to the longitudinal direction 10 and perpendicular to the locking direction 13. That is to say, the tabs 24 are elastically deformable in such a way as to apply an elastic force in a direction perpendicular to the elastic force applied by the tongue 11.

The presence of the tabs 24 reduces the section of the tongue 11 and imparts elasticity to the same.

It should also be noted that the tongue 11 is tapered towards its free end, provided with the tooth 12. This allows the tongue 11 to deform inwards in the socket 16, to enable the tooth 12 to reach the zone of the socket 16 where the recess 19 is. Once that zone has been reached, the tooth 12 snaps into the recess and the tongue 11 snaps back elastically to its undeformed configuration.

In light of this, attention is drawn to the following, with regard to the shape of the member 9 and of the socket 16 (the male and female parts of the fastening system, respectively).

The elongate member 9 has a front face 25 and a rear face 26 arranged perpendicularly to the locking direction. The front face is the one on the side which the tooth 12 protrudes from.

The front face 25 of the elongate member 9 has a flat central portion from which the tooth 12 (and the shoulder 22, where present) protrudes in relief.

The rear face 26 of the elongate member 9 has a flat portion adjacent to the zone of connection with the corresponding portion of the temple 1.

The flat portions of the front face 25 and of the rear face 26 of the member 9 are parallel to each other and extend lengthwise.

The portions of the front and rear faces 25 and 26 of the member 9 defined by the tabs 24 are aligned with the corresponding flat portions. In effect, in the locking direction 13, the tabs have a constant cross section.

The end portion of the rear face 26 of the member 9 defined by the tongue 11 is inclined to the flat portion (and to the portion defined by the tabs 24), to define the taper. Thus, in the locking direction 13, the cross section of the tongue 11 decreases from the root 14 to the tip 15 and increases suddenly at the tooth 12.

Further, it should be noted that the tooth 12 preferably has a front surface 27 which is rounded, that is, radiused on the side towards which the tooth 12 protrudes.

This facilitates inserting the member 9 into the socket 16 and releasing the tooth 12.

Preferably, the shoulder 22 also has a front surface 28 which is rounded, that is, radiused on the side towards which the shoulder 22 protrudes.

This facilitates inserting the shoulder 22 into the socket 16.

In light of this, it should be noted that the further recess 21 of the socket 16 is also radiused relative to the wall of the rest of the socket (in particular relative to the portion of the socket wall that is more towards the inside than the further recess 21).

The socket 16 is delimited, perpendicularly to the locking direction 13, by two flat parallel walls 29.

The distance between the flat parallel walls 29 of the socket 16 is substantially the same (taking also into account the tolerances necessary to allow the member 9 to be inserted) as the distance between the flat portions of the front and rear faces 25 and 26 of the member 9.

One of the flat parallel walls 29 of the socket 16 defines the recess 16 (and preferably the second recess 19), to receive the tooth 12 (and preferably the shoulder 22).

During insertion of the member 9 into the socket 16, since the distance (measured along the locking direction 13) between the flat zone of the rear face 26 of the member 9 and the surface of the tooth 12 is greater than the distance between the flat parallel walls 29 of the socket 16, the tongue 11 is deformed until the tooth reaches the recess 19.

The socket 16 is also delimited by two side walls 30 parallel to the locking direction 13.

The side walls 30 of the socket 16 diverge towards the opening 17, in such a way as to form a flaring of the socket 16 towards the opening 17.

The socket 16 is shaped in such a way that the inclination between the side walls 30 of the socket 16 is greater than the inclination between the side walls 23 of the member 9.

That way, insertion of the member 9 into the socket produces interference on the elongate member and pressure (constraint reaction) between the side walls 30 of the socket 16 and the side walls 23 of the elongate member 9. This causes the tabs 24 to bend towards each other.

Preferably, the cross section of the member 9 is smaller than the cross section of the end of the corresponding portion of the temple. Preferably, the connection zone between the member 9 and the corresponding portion of the temple forms at least one step 31.

The step 31 defines at least one further limiting abutment surface between the two ends of the temple, which prevents the member 9 from being inserted further into the socket 16.

In the embodiment illustrated, the first fastening end belongs to the second portion 3 of the temple 1, and is labelled 8 in the drawings, and the second fastening end belongs to the first portion 2 of the temple 1, and is labelled 5 in the drawings.

Preferably, the elongate member 9 is made of plastic.

Preferably, the first portion 2 of the temple 1 is made of metal. Preferably, the first portion 2 of the temple 1 defines the fastening end 5 comprising the socket 16.

As regards releasing the tooth 12 to enable the member 9 to be extracted from the socket 16, attention is drawn to the following.

Preferably, the portion of the temple 1 comprising the socket 16 defines, in addition to the socket 16, a passage 32 configured to place the recess 19 in communication with the outside of that portion of the temple 1.

In the example illustrated (where the portion comprising the socket 16 is the first portion 2 of the temple 1), the first portion 2 of the temple 1 defines a passage 32 (in addition to the socket 16) configured to place the recess 19 in communication with the outside of the first portion 2 of the temple 1.

The passage 32 is shaped to allow insertion of a release element 33 through the selfsame passage 32.

The release element 33 has a flattened shape (like a key) or the shape of rod.

Inserting the release element 33 into at least one portion of the recess 19 of the socket 16 makes it possible to move the tooth 12 out of the recess 19, bending the tongue 11 and thus allowing the member 9 to be extracted from the socket 16.

Preferably, the passage 32 is shaped in such a way as to allow insertion (through the selfsame passage 32) of only one release element 33 having a predetermined shape and constituting a key. Preferably, the release element 33 is a coded key.

As regards the position of the passage 32, it is important for the passage 32 to have an inlet located towards the outside of the portion of the temple 1 defining the socket and an outlet on the inside wall of the socket 16 defining the recess 19.

In light of this, two example embodiments of the passage 32 are illustrated. It should be noted that these example embodiments of the passage 32 are possible alternatives but they might also be present in combination since the presence of a passage of the first type does not exclude the presence of a second passage of the second type.

In a first example embodiment (preferred), the passage 32 is oriented parallel to the longitudinal direction 10 (of insertion and extraction of the member 9 into and from the socket 16) and has an opening on the outside of the respective portion of the temple 1 (that is, the inlet) facing in the direction away from the opening 17 of the socket 16.

In a second example embodiment, the passage 32 is oriented transversely to the longitudinal direction 10 (of insertion and extraction of the member 9 into and from the socket 16) and has an opening on the outside of the respective portion of the temple 1 (that is, the inlet) on an outside face of the wall 18 delimiting the socket 16 and defining the recess 19.

It should be noted that the outside face of the wall 18 delimiting the socket 16 and defining the recess 19 is preferably flat and smooth and designed to have a logo or a text on it.

In light of this, it should be noted that even in the variant where the wall 18 is provided with a through hole to define the passage 32, the hole (that is, the passage 32) has a small cross section (for example, a few millimetres) so as not to spoil the aesthetic appearance of the temple. In practice, the passage is substantially invisible to someone looking at the eyeglasses from a certain distance.

It should be noted that the invention also provides an eyeglasses frame, comprising a front rim (not illustrated, which may be of any known type, for example in a single piece or in three pieces) mounting two lenses (also not illustrated because they are of known type) and two temples hinged to the front rim.

The temples are temples as described above.

According to the invention, the frame comprises (in the sense that it is equipped with) the release element 33, that is to say, a release key which can be inserted into the passage 32 in order to move the tooth 12 out of the recess and allow the member 9 to be extracted from the socket 16.

The invention claimed is:

1. An eyeglasses temple, comprising:
a first portion having an end which can be hinged to a front rim of the eyeglasses and a fastening end;
a second portion having an end which is designed to be rested on an ear of a wearer of the eyeglasses and a fastening end,
the fastening ends of the first and second portions being fastenable by a snap-in connection, wherein:
a first of the fastening ends comprises an elongate member extending in a longitudinal direction and having a tongue from which a tooth projects transversely to the longitudinal direction, the tongue being elastically deformable to allow the tooth to move in a locking direction transversal to the longitudinal direction;
the second of the fastening ends comprises a socket having an opening to guide the insertion and extraction of the member into and from the socket in the longitudinal direction, and internally defines, on a wall which delimits the socket, a recess shaped to receive the tooth, the tongue and the tooth being completely hidden when inserted into the socket, and wherein a portion of the temple comprising the socket defines a passage configured to place the recess in communication with the outside of the portion of the temple, the passage allowing a guided insertion of a release element.

2. The temple according to claim 1, wherein the passage is oriented parallel to the longitudinal direction of insertion and extraction of the member into and from the socket and has an opening on the outside of the respective portion of the temple comprising the socket facing in the direction away from the opening of the socket.

3. The temple according to claim 1, wherein the passage is shaped to allow insertion through the selfsame passage of only one release element having a predetermined shape.

4. The temple according to claim 1, wherein the elastic tongue projects from the member away from the respective portion of the temple, and wherein the tooth is located at the free end of the tongue, distal from the respective portion of the temple.

5. The temple according to claim 1, wherein
the socket defines a guide for inserting the elongate member into the socket;
the elongate member has a shoulder located near a zone where it is connected to the respective portion of the temple shaped to be inserted with interference into the guide.

6. The temple according to claim 1, wherein the socket and the elongate member have a flattened shape.

7. The temple according to claim 1, wherein the first fastening end belongs to the second portion of the temple and the second fastening end belongs to the first portion of the temple.

8. The temple according to claim 1, wherein the elongate member is made of plastic and the portion of the temple comprising the socket is made of metal.

9. The temple according to claim 1, wherein the elongate member has the shape of a wedge.

10. The temple according to claim 1, wherein the elongate member comprises two resilient tabs projecting in the longitudinal direction of insertion and extraction of the member into and from the socket, located on opposite sides of the tongue and elastically deformable in a direction transversal to the longitudinal direction and perpendicular to the locking direction.

11. The temple according to claim 1, wherein the tongue is tapered towards its free end, provided with the tooth.

12. An eyeglasses frame comprising a front rim mounting two lenses and two temples hinged to the front rim, wherein each of the temples is according to claim 1.

13. The eyeglasses frame according to claim 12, wherein a portion of the temple comprises a socket and also defines a passage configured to place a recess in communication with the outside of said portion of the temple, a coded release being insertable into the passage in order to move the tooth out of the recess and allow the member to be extracted from the socket.

14. A fastening system for detachably connecting two parts of an eyeglasses frame defining respective fastening ends which can be joined to each other by a snap-in connection, wherein
a first of the fastening ends comprises an elongate member extending in a longitudinal direction and having a tongue from which a tooth projects transversely to the longitudinal direction, the tongue being elastically deformable to allow the tooth to move in a locking direction transversal to the longitudinal direction;
a second of the fastening ends comprises a socket having an opening to guide the insertion and extraction of the member through the opening in the longitudinal direction, and internally defines, on a wall which delimits the socket, a recess shaped to receive the tooth, the tongue and the tooth being completely hidden when inserted into the socket, and wherein a portion of the temple comprising the socket defines a passage configured to place the recess in communication with the outside of the portion of the temple, the passage allowing a guided insertion of a release element.

15. An eyeglasses frame having two parts defining respective fastening ends which can be detachably connected to each other by a snap-in connection, wherein
a first of the fastening ends comprises an elongate member extending in a longitudinal direction and having a tongue from which a tooth projects transversely to the longitudinal direction, the tongue being elastically deformable to allow the tooth to move in a locking direction transversal to the longitudinal direction;
a second of the fastening ends comprises a socket having an opening to guide the insertion and extraction of the member through the opening in the longitudinal direction, and internally defines, on a wall which delimits the socket, a recess shaped to receive the tooth, the tongue and the tooth being completely hidden when inserted into the socket, and wherein a portion of the temple comprising the socket defines a passage configured to place the recess in communication with the outside of the portion of the temple, the passage allowing a guided insertion of a release element.

* * * * *